(12) United States Patent
Antoine et al.

(10) Patent No.: US 8,405,384 B1
(45) Date of Patent: Mar. 26, 2013

(54) NON-CONTACT TACHOMETER AND SENSOR

(75) Inventors: Richard G. Antoine, Scarborough (CA); Saverio C. Tropiano, Pickering (CA)

(73) Assignee: Zulia Technologies Inc. (CA)

( * ) Notice: Subject to any disclaimer, the term of this patent is extended or adjusted under 35 U.S.C. 154(b) by 353 days.

(21) Appl. No.: 12/070,351

(22) Filed: Feb. 15, 2008

Related U.S. Application Data

(60) Provisional application No. 60/902,256, filed on Feb. 20, 2007.

(51) Int. Cl.
*G01P 3/46* (2006.01)

(52) U.S. Cl. .......................................... 324/164; 702/145

(58) Field of Classification Search ................ 324/160, 324/163, 164, 166, 167, 169; 73/114.01, 73/114.24, 114.25, 494; 702/145
See application file for complete search history.

(56) References Cited

U.S. PATENT DOCUMENTS

| | | | | |
|---|---|---|---|---|
| 2,591,798 A * | 4/1952 | Faure-Herman | ............... | 324/163 |
| 3,766,535 A * | 10/1973 | Deebel et al. | ............ | 340/870.09 |
| 4,270,176 A * | 5/1981 | Skarvada | ....................... | 702/148 |
| 4,452,079 A * | 6/1984 | Tiller | ............................... | 73/488 |
| 4,482,859 A * | 11/1984 | Fournier | ....................... | 324/661 |
| 4,553,093 A * | 11/1985 | Chikasue | ....................... | 324/169 |
| 4,555,938 A * | 12/1985 | Boucher et al. | .................. | 73/187 |
| 4,574,237 A * | 3/1986 | Hachtel et al. | ................. | 324/173 |
| 4,608,954 A * | 9/1986 | Gray | ............................. | 123/352 |
| 5,043,659 A * | 8/1991 | Lowmiller et al. | ............ | 324/160 |
| 5,144,231 A * | 9/1992 | Tenenbaum et al. | .......... | 324/164 |
| 5,151,654 A * | 9/1992 | Krzywicki et al. | ............ | 324/160 |
| 5,671,833 A * | 9/1997 | Edwards et al. | .......... | 191/12.2 R |
| 5,793,197 A * | 8/1998 | Shirai et al. | .................... | 324/160 |
| 2003/0231013 A1* | 12/2003 | Faymon et al. | ............... | 324/166 |
| 2007/0001663 A1* | 1/2007 | Hrubes | .......................... | 324/164 |
| 2008/0012551 A1* | 1/2008 | Endo et al. | .................... | 324/173 |

FOREIGN PATENT DOCUMENTS

WO     WO 2005088316 A1 *  9/2005

* cited by examiner

*Primary Examiner* — Drew A Dunn
*Assistant Examiner* — Manuel Hernandez (57) ABSTRACT

A non-contact tachometer and sensor system comprises a signal processor module, a sensor module communicably coupled to the signal processor module via a first coaxial cable over which the sensor module sends signals to the signal processing module, and a second coaxial cable communicably coupled to the signal processor module which sends a timed pulse train in which each pulse corresponds to at least one of: a revolutions per minute of an engine, and a valid ignition/injector pulse.

20 Claims, 7 Drawing Sheets

NON-CONTACT TACHOMETER AND SENSOR

CROSS REFERENCE TO RELATED APPLICATIONS

The present invention claims priority from provisional patent application No. 60/902,256, filed on Feb. 20, 2007, and titled NON-CONTACT TACHOMETER AND SENSOR, the entire contents of which are incorporated by reference herein.

FIELD OF THE INVENTION

The present invention is related to tachometers and sensors, and more particularly to a non-contact tachometer and sensor.

BACKGROUND OF THE INVENTION

The Ignition of an internal combustion engine is comprised of two basic types: spark ignition and compression ignition.

Spark Ignition, Primarily Gasoline Engines

The energy emission from a spark in a gasoline engine varies widely depending on a large number of factors related to materials and design. Three primary groups can be identified. A) The older style rotary distributor with either a coil transformer or capacitor discharge through the distributor and wires leading to the spark plugs. B) The slightly newer master coil pack which is controlled by an ECU (engine control unit) and a wire leading to each plug. C) The most modern is individual coil packs, where each ignition coil is mounted directly onto each spark plug, where the current/power source for the plug is separate from the ignition pulse and controlled by an ECU.

Historically, to read the revolutions per minute (RPM) from an engine one would attach a small transformer around one spark plug wire. The resulting pulse would then changed to a logic pulse by some external circuitry, after which a controller or computer would measure the frequency of the pulses and determine RPM (revolutions per minute). In the case of a master coil pack, often the spark plug wires are much heavier and often do not provide enough signal for the sensing transformer to work properly. In the case of individual coil packs, there are no spark plug wires. To measure RPM a different type of probe is used, typically a low voltage version of the standard transformer probe. To use this probe, the wires leading to one plug must be freed from its protective wrapping and only the pulse line placed inside the probe "clamp". An example of a system that works with all 3 of these types is the SmartTach from Accurate Technologies Inc. This "classic" approach leads to several significant issues. Often the spark plug wires are difficult to access, especially in vehicles imported from over-seas. Also, with individual coil packs, it requires the ignition wire be modified by either cutting or compressing the protecting "loom" so that the wire can be accessible enough to attach the probe. Further, in many cars that contain a single master coil, the coil is located in a place which cannot be reached without disassembling the car. In many cases heavy duty, low EMI plug wires are used that attenuate the signal to such a low level that it cannot be seen using conventional equipment. Also, there is no "standard" location or wiring path as these vary significantly from vehicle to vehicle.

As such, what is needed is a sensor that is capable of such significant sensitivity that it can detect levels as low as 2 microvolts to overcome these issues.

Compression Ignition, Primarily Diesel Engines

Diesel engines do not use spark plugs. Diesel fuel ignites when under very high pressure and high temperatures. A diesel engine has glow plugs, which are preheated when the engine is started and continue to remain hot without any additional power. As the fuel is compressed, it ignites. Historically to read RPM from a diesel engine one of three methods are used resulting in various issues. A) Magnetic, a magnet is attached to the rotating mass, a small fixed hall-effect sensor is used to read the magnet as it passes by the sensor. This requires physical mounting inside the engine compartment. B) Optical, a small optical reflector (tape, paint, etc.) is placed on the rotating mass. An optical emitter/detector is placed in a fixed location so that it can sense the passing of the reflector. C) Fuel pulse, a highly sensitive pressure transducer is placed on the fuel line. This transducer senses the changes in fuel pressure as the injectors are fired. In all of these cases, a device must be attached to the vehicle such that it will not fall off or become misaligned during testing.

As such, what is needed is a device that has enough sensitivity to be able to see the small signals present when an injector solenoid is fired to overcome these issues.

SUMMARY OF THE INVENTION

The present invention discloses a non-contact tachometer and sensor. In one embodiment, a non-contact tachometer and sensor system comprises a signal processor module, a sensor module communicably coupled to the signal processor module via a first coaxial cable over which the sensor module sends signals to the signal processing module, and a second coaxial cable communicably coupled to the signal processor module which sends a timed pulse train in which each pulse corresponds to at least one of: a revolutions per minute of an engine, and a valid ignition/injector pulse.

In another embodiment, a non-contact tachometer and sensor system comprises a signal processor module, a sensor module communicably coupled to the signal processor module via a first coaxial cable over which the sensor module sends signals to the signal processing module, and a second coaxial cable communicably coupled to the signal processor module which sends a timed pulse train in which each pulse corresponds to at least one of: a revolutions per minute of an engine, and a valid ignition/injector pulse, wherein the timed pulse train includes transistor to transistor logic level signals and wherein each pulse has a duration of 3 microseconds.

In another embodiment, a non-contact tachometer and sensor system comprises a signal processor module, a sensor module communicably coupled to the signal processor module via a first coaxial cable over which the sensor module sends signals to the signal processing module, and a second coaxial cable communicably coupled to the signal processor module which sends a timed pulse train in which each pulse corresponds to at least one of: a revolutions per minute of an engine, and a valid ignition/injector pulse, wherein the sensor module contains a printed circuit board which includes a capacitor near a central portion of the printed circuit board and four posts at each corner

DETAILED DESCRIPTION OF THE INVENTION

The present invention discloses a process and system for a non-contact tachometer and sensor used to determine the rotational speed of an internal combustion engine for the purposes of performance tuning and determination of performance specifications. Several measurements can be made using the present invention including: emissions (both RF/EMI as well when used in conjunction with an environmental emissions testing system), horsepower, torque, and other performance specifications such as fuel consumption, when used with a NIST certified fuel flow meter and NIST certified odometer, and interference including radiated signals which can interfere with AM/FM radio, cell phones, two way radios, and any other RF receiver (interference also can affect video signals, such as those found in many public safety vehicles, racing vehicles, taxis etc.).

In one embodiment, the present invention is self calibrating and is capable of acquiring the appropriate timing information from either the spark ignition system in a gasoline engine or the fuel injectors from a diesel or gasoline engine. The present invention is able to acquire RPM in the following manner. The coil picks up all the radio frequency emissions that are in close proximity to the sensor. The sensor is designed to attenuate any RF above 4 MHz such that they will be easily filtered out by the signal processor. The filter used for this inside the processor is based on the classic LC filter type and is single pole design. However a large number of common filter topologies could be used as a Low-Pass filter for this purpose. The sensitivity of the coil is adjusted by dynamically adjusting the input impedance of the signal processor. By adjusting the sensitivity of the coil, many of the unwanted signals are not seen by the processor. A detailed description of the sensor operation appears later in this document.

As previously disclosed, limitations associated with a spark ignition engine include spark plug wires that are difficult to access, especially in vehicles imported from over-seas. Also, with individual coil packs, it requires the ignition wire be modified by either cutting or compressing the protecting "loom" so that the wire can be accessible enough to attach the probe. Further, in many cars that contain a single master coil, the coil is located in a place which cannot be reached without disassembling the car. In many cases heavy duty, low EMI plug wires are used that attenuate the signal to such a low level that it cannot be seen using conventional equipment. Also, there is no "standard" location or wiring path as these vary significantly from vehicle to vehicle. The sensor of the present invention is capable of such significant sensitivity that it can detect levels as low as 2 microvolts. This is done not by transformer coupling, but by observing these signals in the RF domain. Depending on the type of ignition, the sensor can be as far away as several feet.

As previously disclosed, limitations associated with a compression ignition engine include attaching a magnet to the rotating mass with a small fixed hall-effect sensor used to read the magnet as it passes by the sensor (which requires physical mounting inside the engine compartment), placing a small optical reflector on the rotating mass (which requires an optical emitter/detector to be placed in a fixed location so that it can sense the passing of the reflector), placing a fuel pulse on the fuel line (which senses the changes in fuel pressure as the injectors are fired). In all of these cases, a device must be attached to the vehicle such that it will not fall off or become misaligned during testing.

In one embodiment, the present invention has enough sensitivity to be able to see the small signals present when the injector solenoid is fired. The electromagnetic pulse emitted from an injector is very small, often a few microvolts. The sensor must be fairly close to an injector for this to work, typically about 8-10 inches. With any type of internal combustion engine, very little is required to mount the sensor. Often simply placing it on top of the engine cover works well. No modification is required other than ensuring it does not fall into any rotating parts. By using Velcro, tie straps, or by wedging it in between something is usually sufficient. Accurate placing or mounting is not required. Sometimes simply placing it under the vehicle, on the ground, directly under the engine, may work as well.

Figure 1:
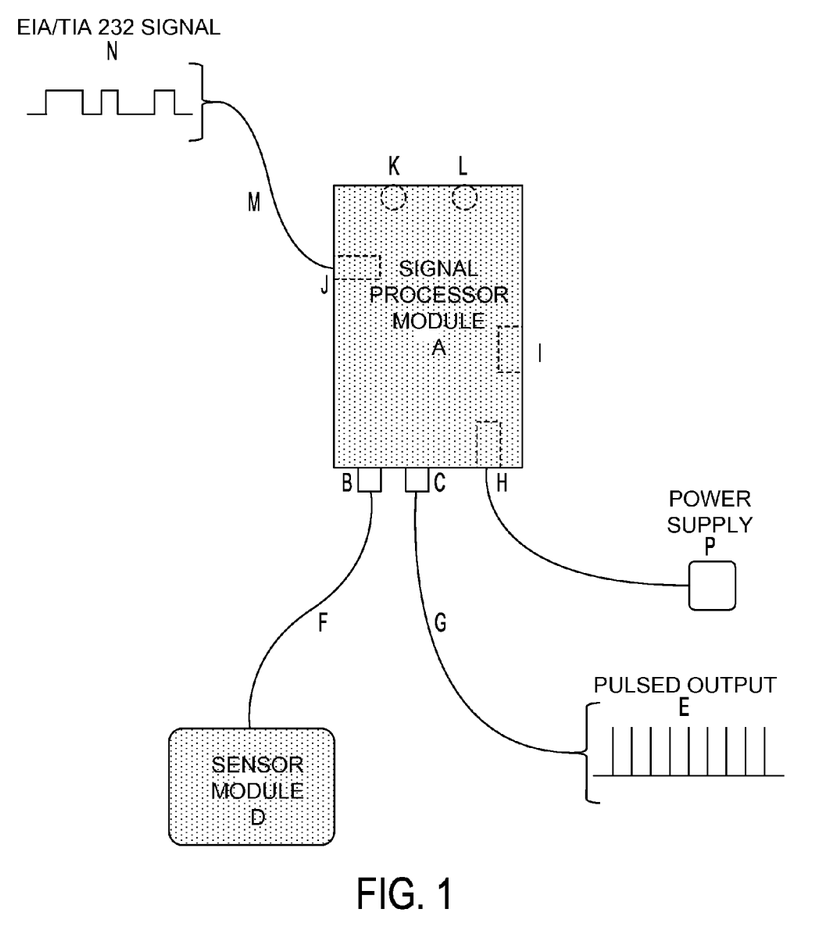
FIG. 1 depicts a device in accordance with one embodiment of the present invention.

FIG. 1 depicts a device in accordance with one embodiment of the present invention. The device includes the following elements:

A) Signal Processor Module
B) Coaxial connection which receives the signals from the sensor
C) Coaxial connection which sends a timed pulse train in which the frequency corresponds to the RPM of the engine. This signal is a TTL (transistor to transistor logic) level signal and each pulse has a duration of 3 microseconds. Each pulse can correspond to either one revolution of the engine or each valid ignition/injector pulse. This is to provide the largest number of uses and makes it compatible with many $3^{rd}$ party analysis tools.
D) Sensor module. This contains a printed circuit board which has a capacitor near the center and 4 posts at each corner. 30 gage wire is wrapped around the circumference of the PCB, using the posts as a guide and retainer. One end of the wire is attached to the PCB and the other to the capacitor. The value of the capacitor is dependent on the desired tuning of the loop (wound wire) and is approximately 10 micro farads.
E) Pulsed output from the sensor module
F) Cable used to attach sensor module to signal processor. The center conductor of a coaxial cable is attached to the capacitor inside the sensor module and the shield wire is attached to the opposite end of the loop. The cable is held in place with a strain relief so it will not break out of the sensor enclosure. The opposite end of the cable is terminated with a coaxial connector, typically a BNC style. The length of the cable should not exceed 10 meters. The type of cable can vary, however it is best to use a rugged, fire resistant type similar to a mil-spec RG316.
G) Simple coaxial patch cable used to interface the signal processor to various $3^{rd}$ party tools.
H) Power jack. The power required by the signal processor must be a DC voltage from 7 volts to 24 volts and allow a minimum of 200 milliamps.
I) On/Off power switch
J) RS232 port jack.
K) Power On indicator L) Signal "lock" indicator. This indicator provides a basic indication of whether the signal processor is looking for a valid signal or whether a valid signal has been found.

M) RS232 cable

N) EIA/TIA 232 signal. This signal provides an ANSI compliant signal which contains a constantly updated stream of bytes that show the RPM.

P) Power supply. A typical power supply would be any readily available 9 volt wall mount adapter rated at 250 milliamps.

The device includes a self calibration process that is an integral part of the sensing process. In its simplest form, the processor controls the attenuator/amplifier network using a binary search method to find the strongest signal which exhibits a consistent pattern synonymous with a vehicle ignition. The processor is constantly, during the entire operating period, using this process to maintain the most optimum signal level. The pattern and timing constants used were developed by observing a wide variety of operating vehicles. Multi spark and other advanced ignition systems which have more than one spark per cylinder per cycle are filtered out by the timing constant within the self calibration process. The device is in a constant state of calibration.

The device includes two main modules: 1) the sensor, and 2) the signal processor. The modules are connected via a low loss coaxial cable which is rugged and fire resistant. Several other methods could be used to link the sensor to the processor module. These other methods include:

Passive RF. This would have much in common with current RFID systems. In this case a small inductor/capacitor would charge by absorbing the RF energy from the engine. When the capacitor reaches a certain voltage, it would discharge, emitting an RF pulse through the remaining circuit. The engine RF data could be encoded in a number of ways. Firstly the amount of energy would increase as the engine was running faster, hence the capacitor would charge and discharge faster. Secondly, the energy inside the capacitor could be used to power a very small microprocessor which would measure the RF from the engine and transmit the data via short RF pulses in a frequency much higher than the RF coming from the engine.

FM low power. This process would require a battery powered microprocessor and would operate in a fashion similar to the passive RF system.

Standard protocols (Bluetooth, Zigbee, etc.) This would involve a battery and a readily available chipset in one of many industrial short range technologies such as Zigbee, Bluetooth etc.

Proprietary hybrid protocol and hardware. This would involve creating a custom solution which would be the best of all the above possibilities.

The existing sensor is a current mode loop design with 19 turns of 30 gage wire around a 2.4×4 inch square with a minimum of analog circuitry. In other embodiments, fewer or greater number of turns, type of wire and square dimensions can be utilized without departing from the scope of the present invention. The sensor receives EMI and EMF signals in a frequency band starting from 1 Hz to approximately 4 MHz (and as high as approximately 4 GHz).

The signal processor contains a mixture of analog and digital signal processing which isolates and amplifies the signal required to determine pulses per second. The digital processor makes the mathematical calculations which result in a number representing the RPM of the engine. The device measures the time between valid RF peaks. A valid RF peak is determined by the other processes described in this document. RPM is determined by dividing the RF peak time into one minute and multiplying by the number of strokes per cycle, in most cases 4. The initial prototype will only measure 4 stroke engines, however future version will be configurable via the serial port. There is one potential flaw, which would occur if more than one valid RF peak were present during one engine cycle. This would be rare, and would occur only if the sensor were placed almost exactly centered between two ignition sources and the engine was running at less than 3000 RPM. Initial estimates and tests suggest that one centimeter difference from one source to another would provide enough deviation for the filters etc. to differentiate between the two pulses and discount the lowest one. Also, the sensor is more efficient if it is aligned with the loop perpendicular to the ignition source rather than parallel.

The RPM is communicated via one of two methods: 1) RS232 serial port which is EIA/TIA232 compliant. 2) A coaxial cable connection which outputs a timed pulse that directly corresponds to the RPM of the engine. The serial port is used to transmit the RPM to the host system. Optionally a USB connection could be used. A wireless link is also possible by using many different industry standard protocols, such as IEEE802.11 (A, B, G, etc.) Care must be taken with any wireless option as it will impact the latency of the signal from the sensor to the host system. Latency beyond a few milliseconds could manifest in countless problems, such as inaccurate RPM, engine over revving, and possibly missed readings.

The timed pulse must have very low latency and as such should be connected with a hard link, i.e. a wire to the host system. The host system resolves these pulses to an RPM reading, the pulses must be within a micro second of the actual RPM of the engine. Noise and unwanted signals from the engine assembly are filtered by a combination of gain control, selective attenuation, digital sampling, analog filtering and digital filtering. Filter theories implemented include:

amplitude time domain relative time domain, random noise historic amplitude, predictive short term historic amplitude, predictive, long term analog LC filter The algorithm which acquires and analyzes the signal is non-linear. This means that the software in the digital processor and the analog hardware work together in a context based routine which contains several types of search and filter principles. LC provides basic filtering. The sensor is a rectangular loop inductor and a capacitor.

Loop inductance is:

$$L_{rect} = N^2 \frac{\mu_0 \mu_r}{\pi} \left[ -2(w+h) + 2\sqrt{h^2 + w^2} - h\ln\left(\frac{h + \sqrt{h^2 + w^2}}{w}\right) - w\ln\left(\frac{w + \sqrt{h^2 + w^2}}{h}\right) + h\ln\left(\frac{2h}{a}\right) + w\ln\left(\frac{2w}{a}\right) \right]$$

N=number of turns, w=width of loop, h=height of loop, a=wire radius, ur=relative permeability of the material onto which the loop is assembled.

Cut off frequency is: F=1/(2*PI( )SQRT(L*C))

Impedance is: Z=SQRT(L/C)

The computer software based on the formula above was used to model and generate the precise construction details. Manual testing and modification is required to overcome changes introduced by the mechanical assembly. The input is rectified by a diode at the input of the processing module. The signal is then filtered by the digital attenuator which is a resistor network controlled by a high voltage multiplexer connected to the microprocessor. The software inside the microprocessor counts the time between pulses, and if the pulses are not consistent or are not evenly spaced according to pre-defined constants. These constants were established through experimentation. Although a microprocessor is a linear processing device, the speed of the microprocessor in comparison to the incoming signals is well beyond the theoretical Nyquist processing rate. Hence, for practical purposes this system can process several tasks simultaneously.

Several processes happen when a pulse is detected on the input of the Microprocessor including:

The time is captured from the last pulse, if it is the first one, a time of 0 is used for the first calculation.

The time is compared to the previous 10 measurements, if the time appears out of range, the pulse is discounted and the timer is set to the last time measured. These measurements are stored in memory inside the micro.

This bad pulse triggers a change in the digital attenuator, which is changed according to the last 3 measurements. This change is based on whether the attenuator was increasing or decreasing.

If no pulse is detected after changing the attenuator or there are no pulses, the attenuator is set to its lowest setting, which is maximum sensitivity. The last few measurements are reset as well.

There is no analog to digital converter in the conventional sense. Most affordable converters are too slow and cannot sample fast enough. The net effect of the software and digital attenuator is a rudimentary converter which operates at very high speeds.

Several An example of the software (functional) is below.

EXAMPLE

```
// pulse input pin b0
//         mux address lines: a0 = pin b4, a1 = pin a0, a2 = pin b1, EN = pin b3
// start mux at output 7 and search down, then go to 8. (8 is amplified)
//         truth table:
//         pin:b1           a0      b4      b3
//                          a2      a1      a0      en      switch
//                          0       0       0       1       1
//                          0       0       1       1       2
//                          0       1       0       1       3
//                          0       1       1       1       4
//                          1       0       0       1       5
//                          1       0       1       1       6
//                          1       1       0       1       7
//                          1       1       1       1       8
//
//         output: pin a1
//
//
//
#include <16F88.h>
//#include <stdlib.h>
#fuses INTRC,PUT,NOWDT,NOLVP,NOPROTECT,CCPB0
//#device ICD=TRUE
#define START_TACH    0
#define RUN_TACH      1
#define DONE_TACH     2
#define clock_scalar  8
#define debuging      1
#use delay ( clock=2000000 )
#USE RS232(BAUD=9600, XMIT=PIN_B5, RCV=PIN_B2, PARITY=N, BITS=8)
static char cState, vPulse;
static long iCount;
char pulsediv = 1;
// ****************************************************************
// INTERRUPT ROUTINES
//
#int_ccp1
void CCP1Interrupt ( void )
    {
        long tempcount;
            if ( cState == RUN_TACH ) // second edge
        {
        tempcount = CCP_1;     // get capture value
            if (tempcount >300)
                {
                    iCount = tempcount;      // get capture value
                cState =DONE_TACH;    // prevent further processing during this interrupt
                }
        }
        if ( cState == START_TACH )    // first edge
        {
        set_timer1 ( 0 );      // restart timer on this edge
        cState = RUN_TACH;
        }
    if ( vPulse == 1 )
```

EXAMPLE -continued

```
            {
            if (tempcount > 300)
                {
                    output_high(pin_a1);
                    delay_us(5);
                    output_low(pin_a1);
                }
            }
        }
//
void blink( )
{
output_high(pin_a4);
delay_ms(50);
output_low(pin_a4);
delay_ms(50);
}
// ****************************************************************
// mux state change
//
void mux(state)
{
switch (state) {
            // switch 8
    case 0:   output_low(pin_b3);
              output_high(pin_b1);//a2
              output_high(pin_a0);//a1
              output_high(pin_b4);//a0
              output_high(pin_b3);// en
              if (debuging > 0) blink( );
        break;
            // switch 1
    case 1:   output_low(pin_b3);
              output_low(pin_b1);//a2
              output_1ow(pin_a0);//a1
              output_low(pin_b4);//a0
              output_high(pin_b3);// en
              if (debuging > 0) blink( );
        break;
            // switch 2
    case 2:   output_low(pin_b3);
              output_low(pin_b1);//a2
              output_low(pin_a0);//a1
              output_high(pin_b4);//a0
              output_high(pin_b3);// en
              if (debuging > 0) blink( );
        break;
            // switch 3
    case 3:   output_low(pin_b3);
              output_low(pin_b1);//a2
              output_high(pin_a0);//a1
              output_low(pin_b4);//a0
              output_high(pin_b3);// en
              if (debuging > 0) blink( );
        break;
            // switch 4
    case 4:   output_low(pin_b3);
              output_low(pin_b1);//a2
              output_high(pin_a0);//a1
              output_high(pin_b4);//a0
              output_high(pin_b3);// en
              if (debuging > 0) blink( );
        break;
            // switch 5
    case 5:   output_low(pin_b3);
              output_high(pin_b1);//a2
              output_low(pin_a0);//a1
              output_low(pin_b4);//a0
              output_high(pin_b3);// en
              if (debuging > 0) blink( );
        break;
            // switch 6
    case 6:   output_low(pin_b3);
              output_high(pin_b1);//a2
              output_low(pin_a0);//a1
              output_high(pin_b4);//a0
              output_high(pin_b3);// en
              if (debuging > 0) blink( );
```

-continued

EXAMPLE

```
                break;
                        // switch 7
        case 7: output_low(pin_b3);
                output_high(pin_b1);//a2
                output_high(pin_a0);//a1
                output_low(pin_b4);//a0
                output_high(pin_b3);// en
                if (debuging > 0) blink( );
                break;
default:output_low(pin_b3);
                output_high(pin_b1);//a2
                output_high(pin_a0);//a1
                output_low(pin_b4);//a0
                output_high(pin_b3);// en
                if (debuging >0) blink( );
                break; }
}
// ***********************************************************
// MAIN CODE
void main ( void )
    {
//      setup_oscillator( OSC_4MHZ | OSC_INTRC );
    char cCnt;
        char a;
    float fRpm;
    int32 int32Count;
    // SETUP TIMER 1
    setup_timer_1 ( T1_INTERNAL | T1_div_by_8);
    // SETUP CCP1
    setup_ccp1 ( CCP_CAPTURE_RE );      // capture every rising edge
    // INITIAL MESSAGE
    delay_ms ( 200 );       // wait enough time after Vdd rise
    // ENABLE INTERRUPTS
    enable_interrupts ( INT_CCP1 );     // CCP1 interrupt
    enable_interrupts ( GLOBAL );       // enable all interrupts
        vPulse = 1;
    cState = DONE_TACH;
        a=7;
        mux(a);
    while ( TRUE )
      {
      int32Count = 0;
      for ( cCnt = 0; cCnt < 1; cCnt++ )    // accumulate readings
        {
        cState = START_TACH;            // allow interrupt to start
        while ( cState != DONE_TACH )   // wait for timing to complete
          {
          if ( get_timer1( ) > 62000)   // timeout counter
            {
            iCount = 0;    // zero everything out
            int32Count = 0;
            break;          // don't wait any longer
            }
          }
        int32Count += iCount;   // otherwise accumulate
        }
      int32Count /= 1;          // get average of readings
      fRpm = 1 / ( float ) int32Count;  // period in uS
      fRpm *= 1000000;          // period in seconds
      fRpm *= 60;               // period in minutes
      fRpm /= clock_scalar;     // adjust for high speed oscillator
            if (fRpm<1)
                {
                if (a<1) a=7;
                a--;
                mux(a);
                }
                else
                {
                delay_us(1);
                delay_us(1);
                }
                printf("%6.0g\n\r",fRpm);
    }
}
```

There are very few other algorithms which can achieve the same results. The most predominant one is based on an analog to digital converter which must operate very fast. This converter must be used in combination with a very selective filter, which is controlled by a precise local variable oscillator. An example of such devices are similar to an oscilloscope or a spectrum analyzer. Commercial devices for measuring this range from several thousand dollars to tens of thousands of dollars. They operate by sweeping the filter across the desired frequency band and measuring the energy level with an analog to digital converter. This must be done very quickly in order to obtain real time data. Many test systems sweep multiple times within a single cycle in an attempt to capture the best or highest resolution dataset.

The present invention would be connected to the host system by either serial, pulse, or both. In the instance of a chassis dynometer (or dyno), several configurations are possible. For example. A chassis dyno from Mustang Dyno is based on a personal computer with specialized data acquisition hardware. The device of the present invention would be connected to both the serial and the analog pulse input ports of the PC. The dyno software on the PC reads the pulse from the device and calculates the RPM. The PC software then reads the data from the serial port and uses both readings to calculate an even more accurate reading, which accounts for latency and any internal timing error of the PC and overall system. Other dynometer manufacturers may or may not use both serial and pulse signals. This varies depending on manufacturer specifications. The device can also be used in conjunction with standard PC's and systems which have RS232 or USB ports.

To acquire this data, two controls can be provided: 1) Set or sweep the timing constant. This would act as a low pass filter. The resulting pulse would reflect the various signals present above the frequency derived by the timing constant, 2) Locking or sweeping the RX attenuator. This would act as an amplitude filter.

EMC requirements for existing and future automotive manufacturers, both aftermarket, and OEM, continue to evolve. The table below contains just a few of the standards by which emissions are measured and governed:

| Standard | Issuing Body | Scope | Topic | Date of Issue |
| --- | --- | --- | --- | --- |
| 95/54/EC | EC | European Union | Radiated emissions and immunity | 1995 |
| CISPR 12 | IEC | Global | Radiated emissions and immunity | 2001 |
| SAEJ551 | SAE | North America | Radiated emissions and immunity | 1995 |
| SAEJ1113 | SAE | North America | Radiated emissions and immunity | 1995 |

The radiated emissions can be measured by using the device with appropriate software on a host system. The host software would, via the serial port (either USB or otherwise), set the timing and attenuator in precise steps, measuring the results at each step. The result would be a collection of samples that then can be used to determine emissions levels and compliance. The actual test procedure and technical requirements for each standard is defined in the relevant standard.

Figure 2A:
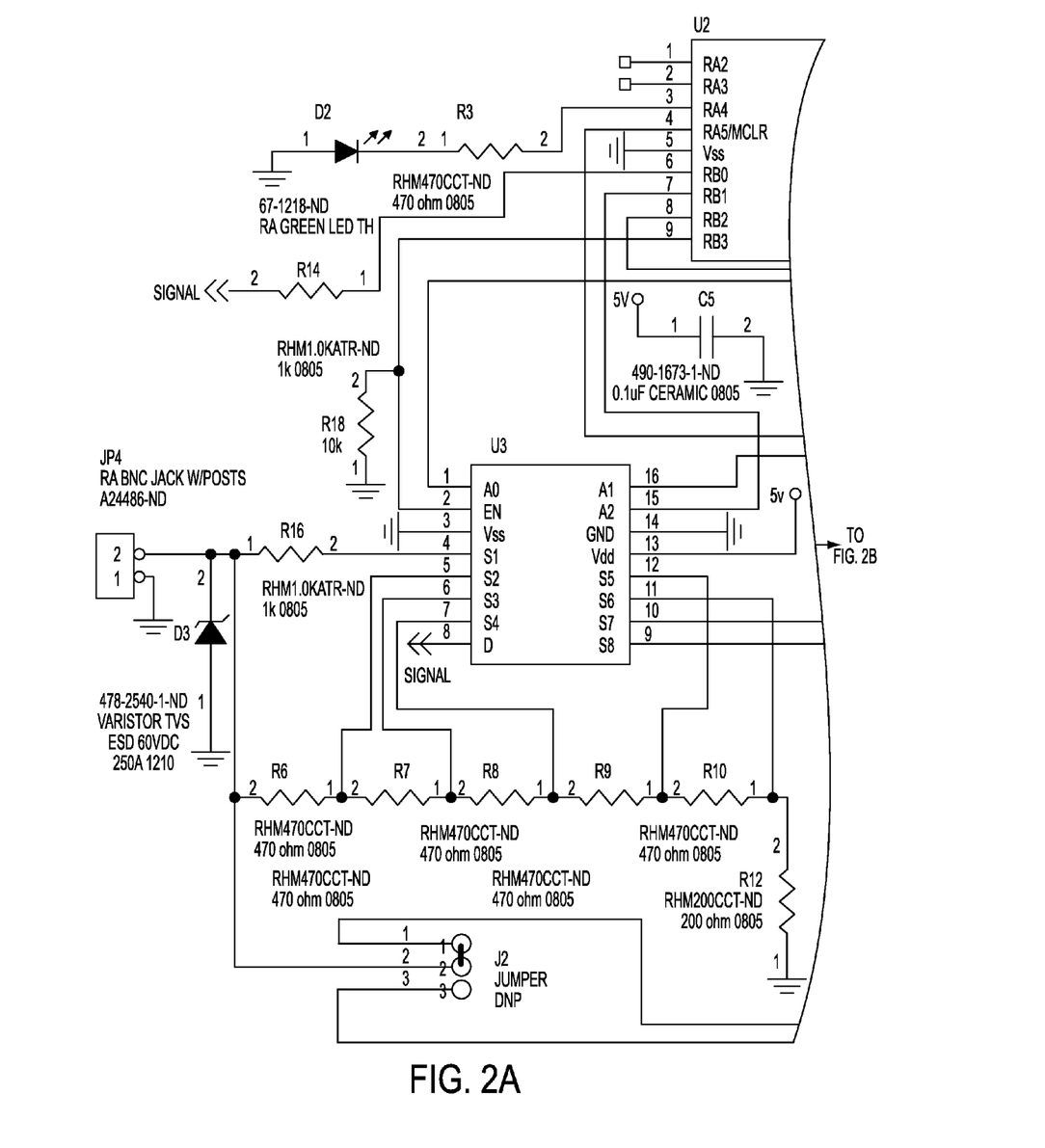
FIGS. 2A and 2B depicts a schematic diagram of functional portions of a signal processor module of the device in accordance with one embodiment of the present invention.
Figure 2B:
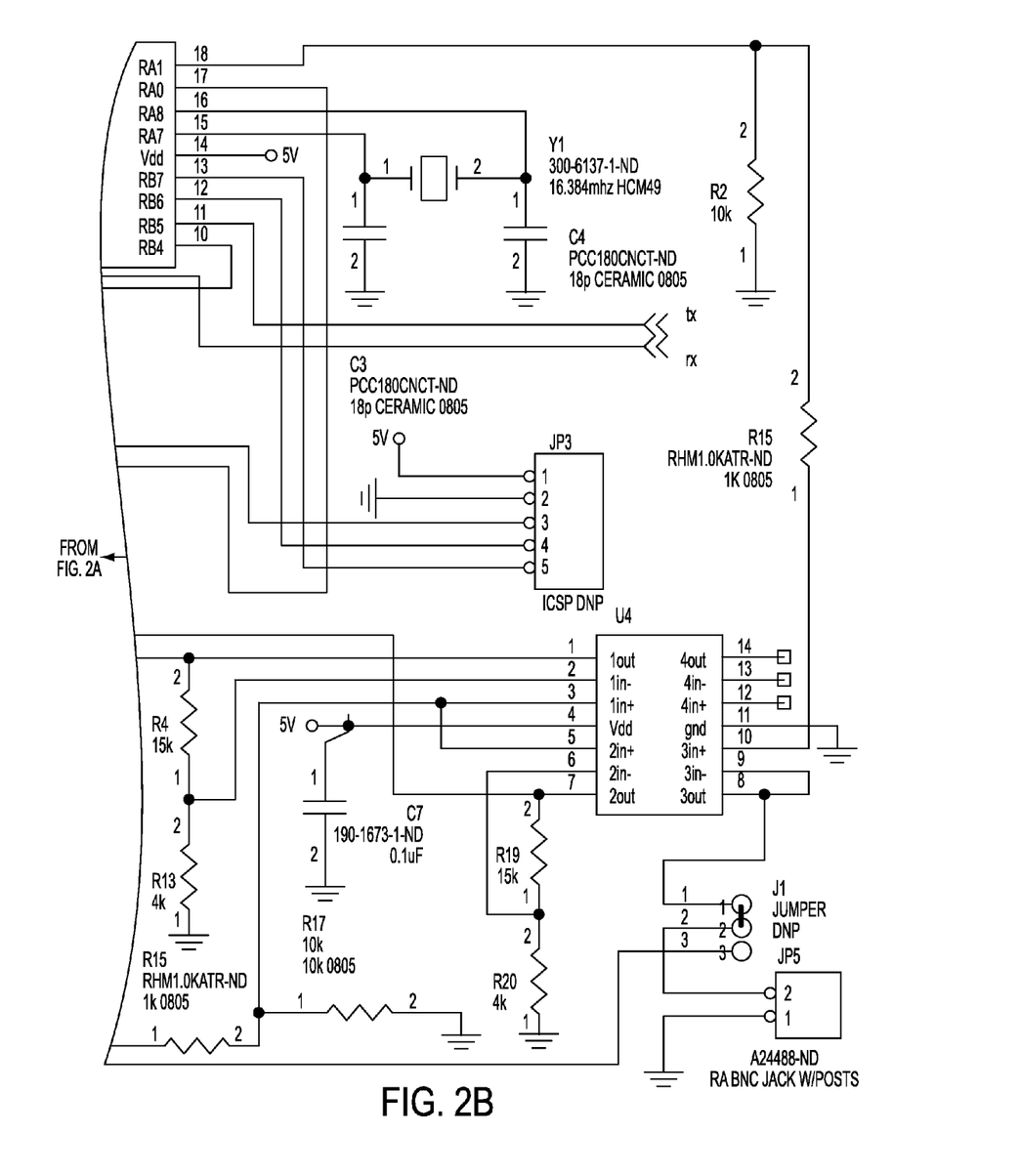

FIGS. 2A and 2B depicts a schematic diagram of functional portions of the signal processor module of the device.

Figure 3:
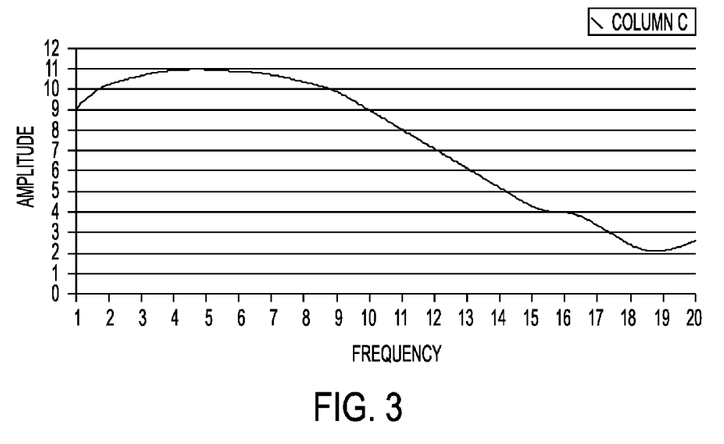
FIG. 3 depicts a graph of radiated electromagnetic emissions from an automobile in accordance with one embodiment of the present invention.

There are 3 primary functional block within the Signal Processor module. The digital attenuator and high voltage multiplexer allows the Micro Processor to control the signal attenuation and can also switch in signal gain from the amplifier as required. This is part of the amplitude filter mechanism. The amplifier has 3 primary signal paths, 2 of which are used to increase the incoming signal strength and the third is used to buffer the pulsed output. The 2 paths used to increase the signal are part of the amplitude filter. The pulsed output needs to be buffered to provide adequate current for the host system and to protect the Micro processor from being damaged by excessive current drain. The micro processor with the functional software controls all portions of the system and implements the filter algorithms and calculates the RPM. The micro processor reports the measurements of signal amplitude and RPM via the serial port which is EIA232 compliant. These measurements are reported in real time and can be used for a real time display on the host system FIG. 3 depicts a graph of radiated electromagnetic emissions from an automobile. Such results are based on using a chassis dyno and providing realistic information from an operating automobile under various potential loads. The results obtained by recording the amplitude of the radiated electromagnetic emissions as the engine is operated over its specified RPM range can be analyzed and can show areas where the emissions may be high enough that they could be received by a number of devices, such as cellular telephones, AM/FM radios, 2 ways radios as are often used by public safety officials. This can often be heard as a high pitched squeal on the speakers of the affected equipment. The data, which is often illustrated as a graph, can be critical in helping determine compliance with regulations, or for vehicle designers and enthusiasts to build better, safer, more efficient, and more reliable vehicles.

Figure 4:
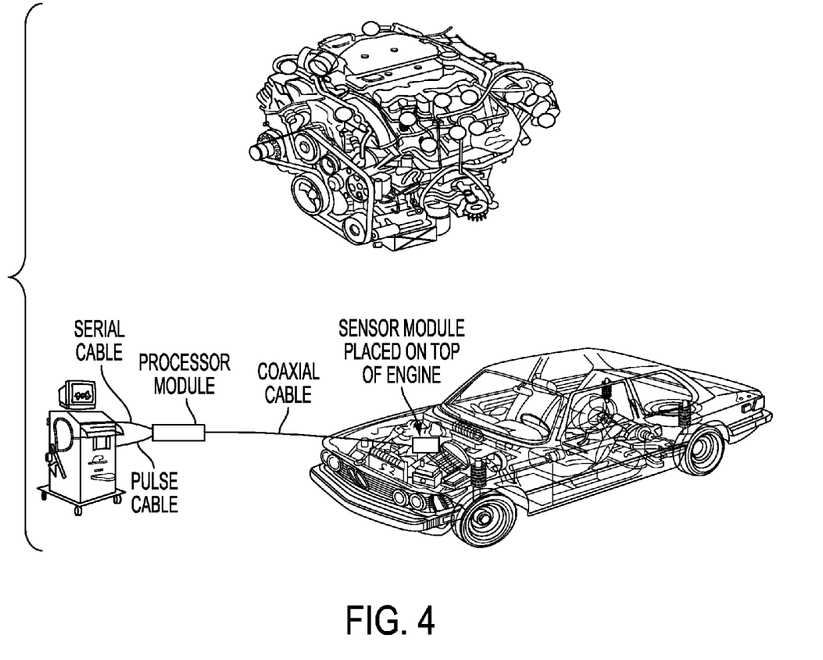
FIG. 4 depicts various locations that the device can be connected to an engine and to a workstation in accordance with one embodiment of the present invention.

FIG. 4 depicts various locations that the device can be connected to an engine and to a workstation. As can be seen, there are multiple locations on the engine where the sensor module can be located. The processor module is communicably coupled to the workstation (or to a workstation and instrument cart) to produce various readings and measurements.

Figure 5:
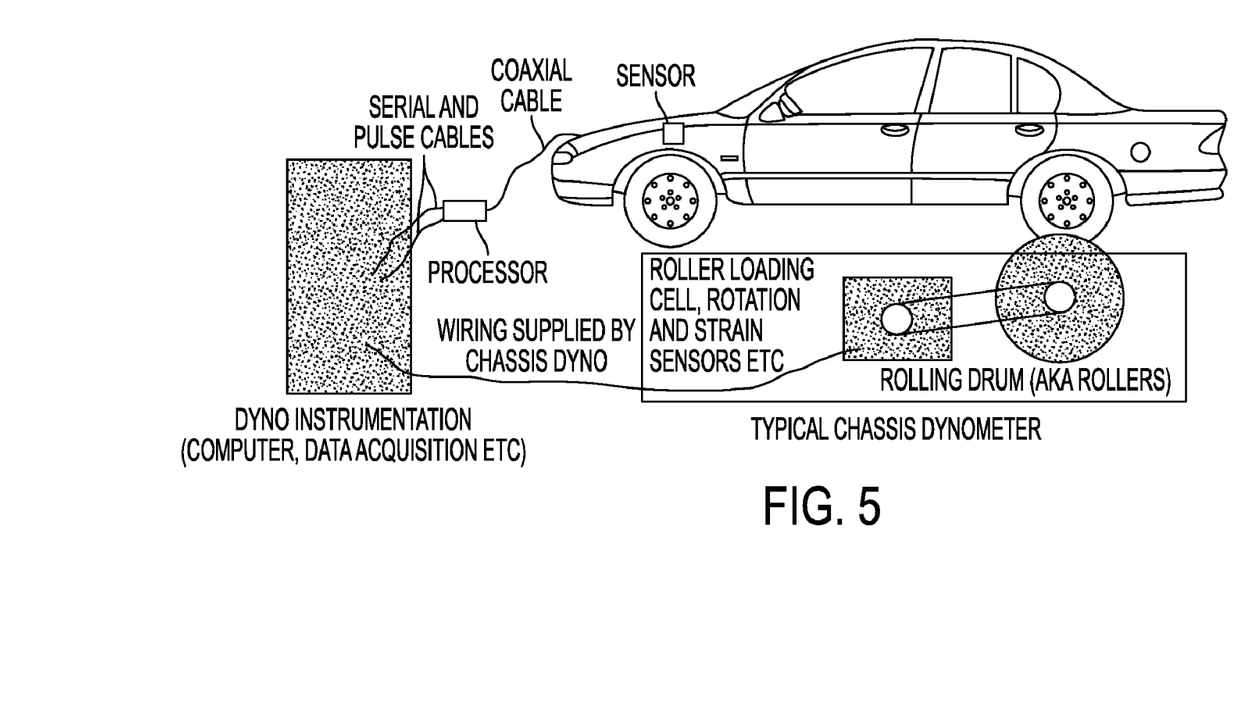
FIG. 5 depicts the device configured with a chassis dynometer in accordance with one embodiment of the present invention.

FIG. 5 depicts the device configured with a chassis dynometer. When using a Chassis Dynometer, the vehicle under test is driven or rolled onto the dyno such that the drive wheels mate with the drive roller as specified in the Dyno manufacturers instructions. The vehicle is securely held in place using high strength straps or chains, for example. The Dyno is configured to test the vehicle as instructed by the manufacturer. The device processor is connected to the Chassis Dyno control computer and the device sensor is placed on or near the engine. The engine is started and the vehicle transmission is placed in gear. Typically the gear used is as close as possible to a 1 to 1 ratio between the engine crank shaft and the rear drive wheel rotation. The accelerator of the vehicle is pressed smoothly and slowly so that the engine runs from idle RPM to maximum RPM. The drive wheels of the vehicle are allowed to rotate and the Dyno roller applies a pre-defined load curve which simulates actual driving loads and stresses on the engine. The device can capture RPM and emissions during this realistic test.

Figure 6:
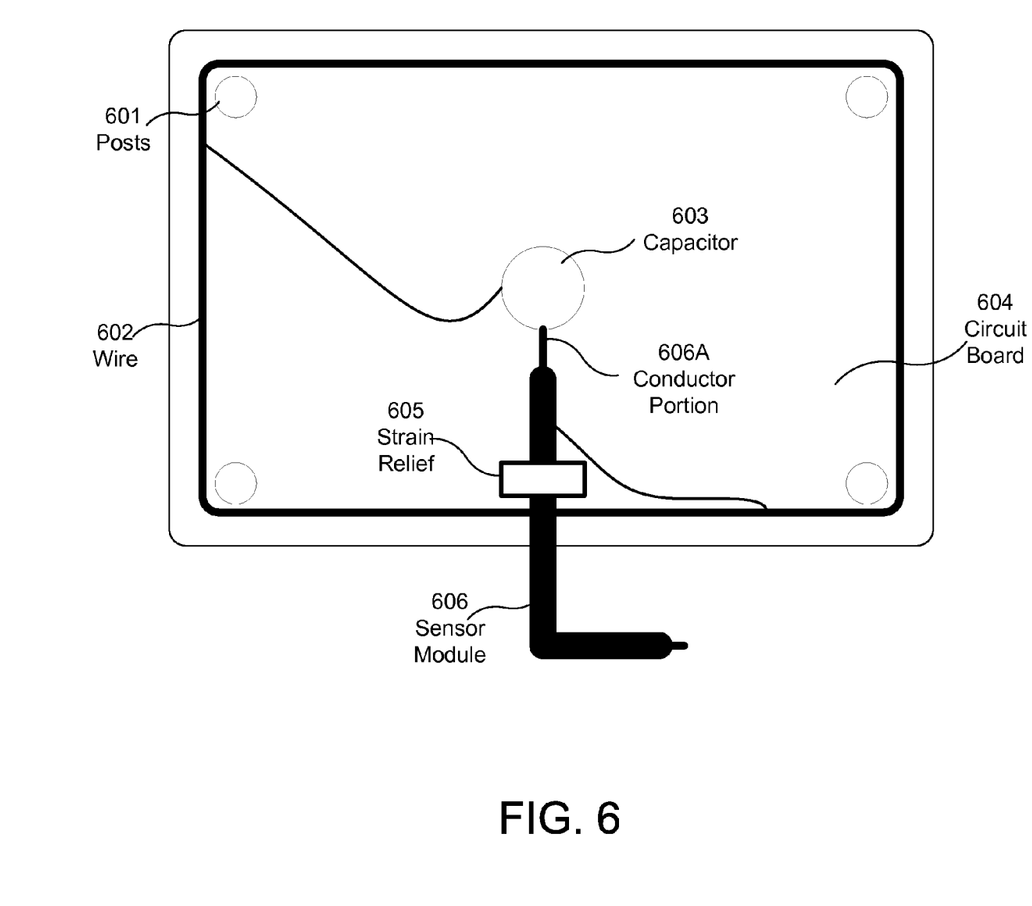
FIG. 6 depicts a printed circuit board configuration in accordance with one or more embodiments of the present invention.

FIG. 6 illustrates another example embodiment of the present invention that includes a sensor module. Referring to FIG. 6, four posts 601 are located at each corner of the circuit board. A wire, such as, for example, a 30-gauge wire may be used to surround the printed circuit board 604. A capacitor 603 is illustrated as being part of the circuit board which is connected to the 30-gauge wire 602. A cable 602 may be used to test the capacitor, which includes a strain relief portion 605 to hold the cable 602 in place and a center conductor portion 606A.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols. The present invention can be used for spectral analysis of modern engines, electro-magnetic analysis of modern ignition systems, interference causing signal analysis, and engine diagnostic analysis. The common elements amongst each of the scenarios are based on the acquisition of data from the engine which is in the time domain (frequency) and amplitude domain (energy). The exact scenario is based on which industry standard is being tested for.

What is claimed is:

1. A non-contact tachometer and sensor system, comprising:
    a first coaxial cable;
    a signal processor module;
    a digital attenuator connected to the signal processor module;
    a sensor module communicably coupled to the signal processor module via the first coaxial cable over which the sensor module sends signals to the signal processor module, the sensor module comprising a current mode loop with a plurality of turns of wire wrapped around a fixed object having a length and width of approximately 2 to 4 inches, and wherein the sensor module is configured to detect electromagnetic signals generated by active engine operation of an internal combustion engine; and
    a second coaxial cable communicably coupled to the signal processor module which sends a timed pulse train in which each pulse of the timed pulse train corresponds to at least one of: a revolutions per minute of an engine, and a valid ignition/injector pulse, wherein the timed pulse train is created based on the electromagnetic signals measured by the sensor module, and a frequency of the pulse train is larger than a frequency of the electromagnetic signals generated by the active engine operation, and
    wherein the signal processor module is configured to measure a time of arrival of a most recently received pulse from among the timed pulse train, and the signal processor module is also configured to compare the time of arrival to a plurality of previous time of arrival measurements to determine whether the time of arrival is out of range with the previous time of arrival measurements and whether to change a current operating state of the digital attenuator.

2. The system of claim 1, wherein the timed pulse train includes transistor to transistor logic level signals and wherein each pulse has a duration of 3 microseconds.

3. The system of claim 1, wherein the sensor module contains a printed circuit board which includes a capacitor that is located adjacent to a central portion of the printed circuit board, and four posts at each respective corner of the printed circuit board.

4. The system of claim 3, wherein the first coaxial cable includes a center conductor that is attached to the capacitor.

5. The system of claim 3, wherein a circumference of the printed circuit board is wrapped with 30 gage wire, using the posts as a guide and retainer.

6. The system of claim 5, wherein one end of the wire is attached to the printed circuit board and another end of the wire is attached to the capacitor.

7. The system of claim 6, wherein a value of the capacitor is dependent on a desired tuning of the wrapped wire and is approximately 10 micro farads.

8. The system of claim 1, wherein the first coaxial cable is held in place with a strain relief.

9. The system of claim 1, wherein a length of the first coaxial cable does not exceed 10 meters.

10. The system of claim 1, wherein the second coaxial cable is communicably coupled to at least one of: a personal computer, a workstation, or any device able to receive and process information.

11. The system of claim 1 comprising a power jack communicably coupled to the signal processor module.

12. The system of claim 11, wherein the power supply is a 9 volt wall mount adapter rated at 250 milliamps.

13. The system of claim 11, wherein power required by the signal processor is a DC voltage between 7 volts to 24 volts and allows a minimum of 200 milliamps.

14. The system of claim 1 comprising an On/Off power switch communicably coupled to the signal processor module.

15. The system of claim 1 comprising an RS232 port jack communicably coupled to the signal processor module.

16. The system of claim 1 comprising a power on indicator communicably coupled to the signal processor module.

17. The system of claim 1 comprising a signal lock indicator communicably coupled to the signal processor module.

18. The system of claim 17, wherein the signal lock indicator provides a basic indication of whether the signal processor is looking for a valid signal or whether a valid signal has been found.

19. A non-contact tachometer and sensor system, comprising:
    a first coaxial cable;
    a signal processor module;
    a digital attenuator connected to the signal processor module;
    a sensor module communicably coupled to the signal processor module via the first coaxial cable over which the sensor module sends signals to the signal processor module, the sensor module comprising a current mode loop with a plurality of turns of wire wrapped around a fixed object having a length and width of approximately 2 to 4 inches, and wherein the sensor module is configured to detect electromagnetic signals generated by active engine operation of an internal combustion engine; and a second coaxial cable communicably coupled to the signal processor module which sends a timed pulse train in which each pulse of the timed pulse train corresponds to at least one of: a revolutions per minute of an engine, and a valid ignition/injector pulse, wherein the timed pulse train includes transistor to transistor logic level signals and wherein each pulse has a duration of 3 microseconds, wherein the timed pulse train is created based on the electromagnetic signals measured by the sensor module, and a frequency of the pulse train is larger than a frequency of the electromagnetic signals generated by the active engine operation, and wherein the signal processor module is configured to measure a time of arrival of a most recently received pulse from among the timed pulse train, and the signal processor module is also configured to compare the time of arrival to a plurality of previous time of arrival measurements to determine whether the time of arrival is out of range with the previous time of arrival measurements and whether to change a current operating state of the digital attenuator.

20. A non-contact tachometer and sensor system, comprising:

a first coaxial cable;

a signal processor module;

a sensor module communicably coupled to the signal processor module via the first coaxial cable over which the sensor module sends signals to the signal processor module, the sensor module comprising a current mode loop with a plurality of turns of wire wrapped around a fixed object having a length and width of approximately 2 to 4 inches, and wherein the sensor module is configured to detect electromagnetic signals generated by active engine operation of an internal combustion engine; and a second coaxial cable communicably coupled to the signal processor module which sends a timed pulse train in which each pulse of the timed pulse trains corresponds to at least one of: a revolutions per minute of an engine, and a valid ignition/injector pulse, wherein the sensor module contains a printed circuit board which includes a capacitor that is located adjacent to a central portion of the printed circuit board, and four posts at each respective corner of the printed circuit board, wherein the timed pulse train is created based on the electromagnetic signals measured by the sensor module, and a frequency of the pulse train is larger than a frequency of the electromagnetic signals generated by the active engine operation, and wherein the signal processor module is configured to measure a time of arrival of a most recently received pulse from among the timed pulse train, and the signal processor module is also configured to compare the time of arrival to a plurality of previous time of arrival measurements to determine whether the time of arrival is out of range with the previous time of arrival measurements and whether to change a current operating state of the digital attenuator.

* * * * *